Jan. 18, 1966    J. B. REISINGER    3,229,562
OPTICAL ALIGNMENT INSTRUMENT
Filed June 8, 1960    3 Sheets-Sheet 2
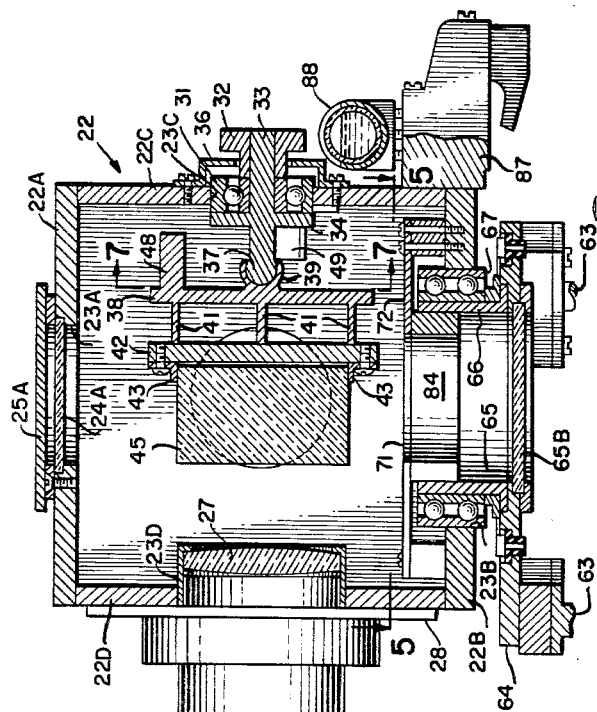
FIG. 3.
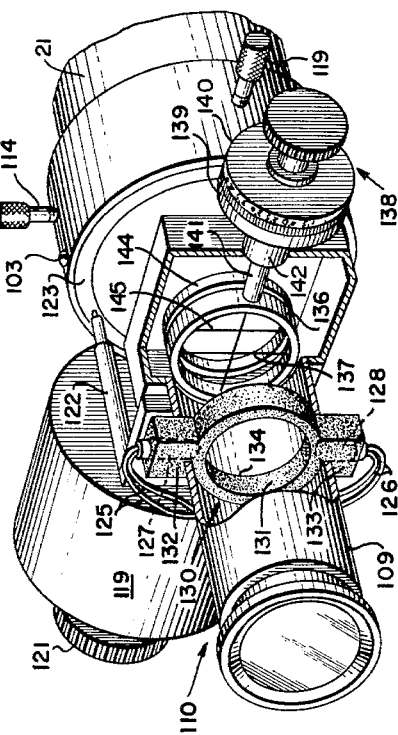
FIG. 7.
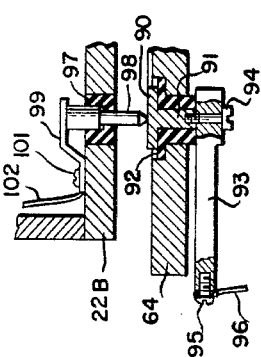
FIG. 6.
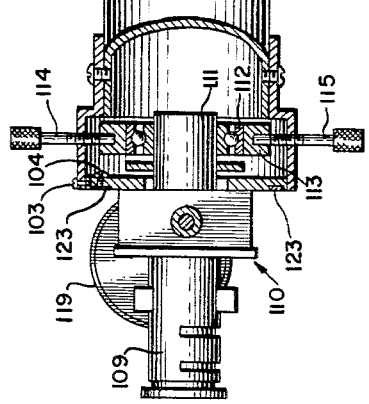
INVENTOR
John B. Reisinger
BY *Fidelman & Lavine*
ATTORNEY Jan. 18, 1966 J. B. REISINGER 3,229,562
OPTICAL ALIGNMENT INSTRUMENT
Filed June 8, 1960 3 Sheets-Sheet 3

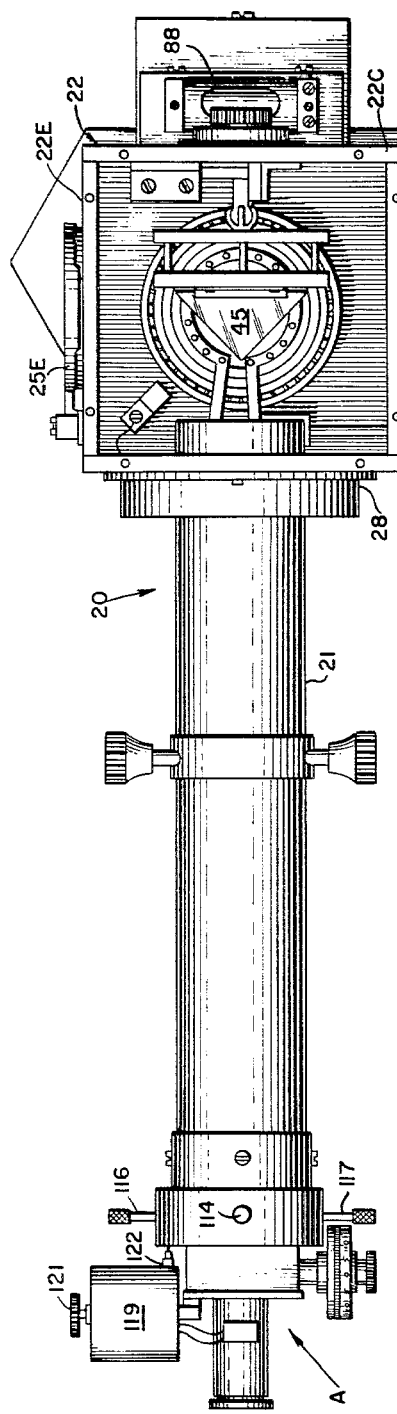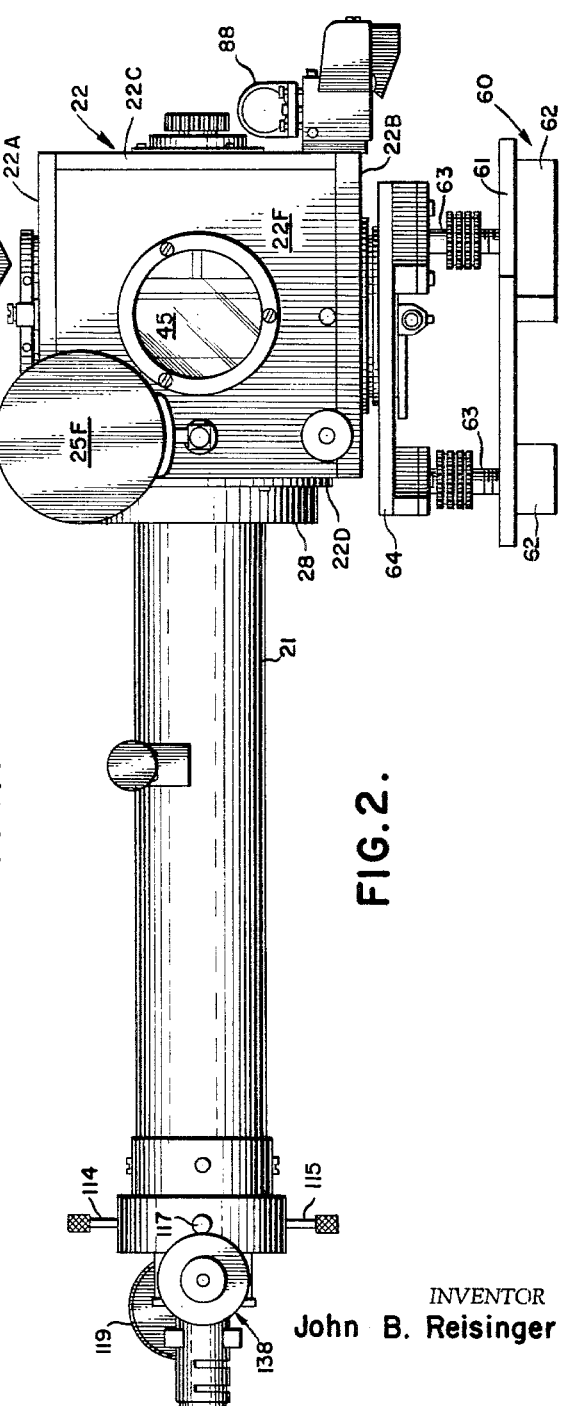

INVENTOR,
John B. Reisinger

BY *Fidelman & Lavine*
ATTORNEY ved Jan. 18, 1966

United States Patent Office 3,229,562
Patented Jan. 18, 1966

3,229,562
OPTICAL ALIGNMENT INSTRUMENT
John B. Reisinger, Cocoa Beach, Fla.
(5535 Gross Court, Orlando, Fla.)
Filed June 8, 1960, Ser. No. 34,783
14 Claims. (Cl. 88—14)

This invention relates to the art of optical alignment instruments and more particularly to an optical instrument for aligning two sets of spaced points with a reference point.

In certain areas of endeavor, it is necessary that various pieces of equipment be precisely related to each other and to a point of reference, and a particular example of this ploblem has arisen in connection with the placement of units of electronic equipment which are spaced from each other physically and are interconnected. It has been necessary, for example, to first establish a bench mark or base point on the earth's surface, and then to position an interconnected electronic system with reference to this base point. The system itself may comprise a master unit or station to be located exactly above the base point, together with auxiliary or slave stations positioned along two axes passing through the base point.

Because of the intended use of the electronic system, extreme accuracy of location of the units is required. For example, the base bench mark is located to within several thousandths of an inch on the earth's surface. Once the base bench mark has been positioned, however, it has not heretofore been possible to position the units of the electronic system with the necessary degree of accuracy.

In addition to providing a solution to the above basic problem, a suitable instrumentality must be sufficiently light to be portable, must be of rugged construction so as to maintain its accuracy under conditions of field use, and must be constructed to permit relatively rapid use.

An object of the present invention is to provide an instrument that meets all the qualifications and specifications set forth above.

Another object of the present invention is the provision of an instrument in which a movable element may be caused to readily occupy either of two exact positions.

A further object of the present invention is to provide an instrument that will permit sequential observation of points on a vertical axis and of points on an axis perpendicular to the vertical axis.

Yet another object of the present invention is the provision of an optical instrument that will be self-collimating.

Another object of the present invention is to provide an instrument in which a reticule is illuminated in any position of the instrument.

Yet another object of the present invention is the provision of a brake for positioning the instrument in a selected oriented position.

Other objects and the nature and advantages of the instant invention will be apparent from the following description taken in conjunction with the accompanying drawings, wherein:

FIG. 1 is a plan view of an instrument in accordance with the present invention, with parts removed.

FIG. 2 is a side elevation of the instrument of FIG. 1.

FIG. 3 is an elevational view, with parts in section, of the instrument of FIGS. 1 and 2.

FIG. 6 is an enlarged fragmentary view of a part of the electrical system of the instrument.

FIG. 7 is a perspective view, with parts removed, of the eyepiece of the instrument.

Figure 5:
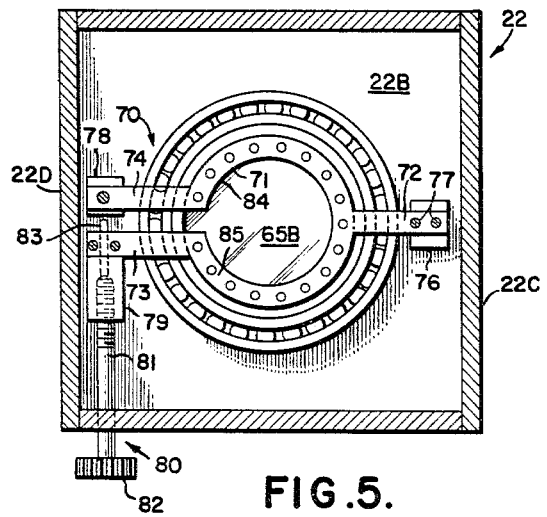
FIG. 5 is a cross-sectional view taken on the line 5—5 of FIG. 3, and showing the brake arrangement of the present invention.

Referring now to the drawings, wherein like reference numerals are used to designate like or corresponding parts throughout the several views, there is shown in the figures an optical instrument 20 comprising a telescope 21 and a housing 22. The telescope 21 is of generally known construction, and carries within it suitable lenses, as will be understood by those skilled in the art. The housing 22 has a top plate 22A, a bottom plate 22B, a front plate 22C, a rear plate 22D, and side plates 22E and 22F. These plates may be seen in FIGS. 1 and 2, and it will be noted that the top plate 22A has been removed from FIG. 1 to better illustrate the construction of the parts within the housing 22.

Each of the plates that make up housing 22, except for front plate 22C, has an opening therein for the transmission of an optical image. Thus, as may be seen in FIG. 3 there is provided in the top plate 22A an opening 23A, the opening 23A having a window 24A, the sides of which are optically flat. Covering the opening 23A and protecting the window 24A when the instrument is not in use is a pivoted cover 25A.

Similar openings, windows and covers are provided in the side plates 22E and 22F.

The opening 23D in the rear plate 22D has inserted thereinto the front end of the telescope 21, there being shown in FIG. 3 the objective lens 27 of the telescope 21.

Telescope 21 is securely mounted in the rear plate 22D by the coupling generally designated 28.

In the opening 23C in front plate 22C, which opening is not an optical opening, there is positioned a ball bearing 31. A control knob 32 having a rearwardly extending shaft 33 is supported in the ball bearing 31, the shaft 33 having a positioning plate 34 within the housing 22. A suitable protective covering 36 is secured to the outer side of the front plate 22C to prevent the entry of dirt into the ball bearing 31. At its rear end, the shaft 33 terminates in a spherical enlargement or ball 37, and a plate 38 having a plurality of claws or fingers engaging over the ball 37 is carried thereby. A rigid connection is provided between the shaft 33 and the plate 38 due to a suitable adhesive or welding material being applied to the ball 37 and claws 39 after they have been suitably aligned subsequent to their initial assembly.

The plate 38 has extending from it a plurality of threaded posts 41, the posts 41 carrying at their outer ends a support plate 42. Secured to support plate 42, as by the fasteners 43, is a prism 45. As is best seen in FIG. 1, prism 45 has two reflecting surfaces positioned at right angles to each other, and it will be understood that other equivalent reflectors may be used.

From a consideration of FIG. 1, it will be apparent that with the prism 45 in the position shown therein, and with the covers 25E and 25F rotated so as to uncover the windows in the side plates 22E and 22F, images to either side of the instrument 20 may be seen through the eyepiece of the telescope 21, the images entering the two aforesaid windows and being reflected by the surfaces of the prism 45 into the telescope.

Figure 4:
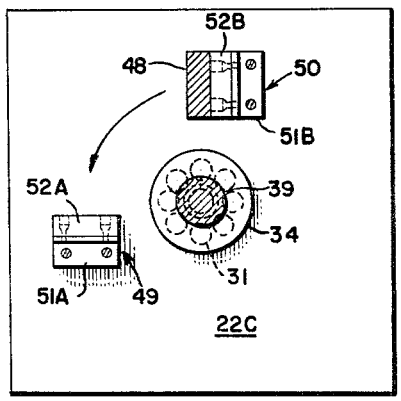
FIG. 4 is a cross-sectional view taken on line 4—4 of FIG. 3, and showing the magnetic stop arrangement of the present invention.

The prism 45 is rotatable through an angle of exactly 90° by rotation of the knob 32. To accomplish this, the plate 38 has a detent member 48 extending from it, as is best seen in FIG. 3, and there is mounted on the front plate 22C a pair of stop members 49 and 50, which may be seen in FIG. 4. Each of the stop members 49 and 50 comprises right angled mounting brackets 51A and 51B, these brackets being secured to the front plate 22C by appropriate screws. Secured to the brackets 51A and 51B are magnets 52A and 52B, these magnets being made of a rubber-like substance with appropriate magnetic qualities. The magnetic stop members 49 and 50 are positioned on front plate 22C so that the detent 48 will come to rest against the one or the other of the magnetic members 52A and 52B upon rotation of the knob 32, and hence prism 45, through exactly 90°. As will be understood, exact adjustment of the positions of the stop members 49 and 50 may be obtained, and the detent 48 may be positioned against the one or the other of them in a gentle movement so that the parts of the instrument are not jarred, while at the same time a positive and accurate positioning of the prism 45 is obtained. Further, the prism 45 will be held in the exact desired position, without danger of becoming inadvertently moved a small amount to a position other than the desired position.

As may be seen from FIG. 2, the entire instrument 20 is supported on a tripod generally designated 60, the tripod having a base 61 and legs 62. As will be understood, the base 61 will have a suitable opening in the mid-region thereof so that a bench mark beneath the tripod 60 may be seen. Level adjustment screws 63 adjustably support a platen 64, and as may be seen from FIG. 3, the platen 64 has a central aperture 65 in which is positioned an optically flat window 65B. Secured to and extending upwardly from the platen 64 is a hollow cylindrical journal 66. On the outer periphery of the journal 66 there is mounted a ball bearing 67, the outer race of which is secured in an opening 23B of the bottom plate 22B. By the above described construction, it may therefore be seen that the entire housing 22, together with the telescope 21 may revolve as a unit about the journal 66 and the platen 64, and that there is provided a line of sight from the prism 45 through the bottom plate 22B and the platen 64.

To enable the housing 22 in telescope 21 to be positively held in any rotative position relative to the platen 64, there is provided in the housing 22 a brake mechanism, which is shown in FIGS. 3 and 5. Brake mechanism, generally designated 70, may be seen to comprise a split, resilient ring 71 having an extension 72 directed generally towards the front plate 22C, and a pair of extensions 73 and 74 directed generally towards the rear plate 22D. Extension 72 is spaced from the bottom plate 22B by a block 76, and is secured to the bottom plate 22B by screws 77. Extension 74 is similarly secured to a spacer block 78, but the spacer block 78 is not secured to the bottom plate 22B. Extension 73 is fastened to bottom plate 22B through a spacer block 79, this latter block having, however, a threaded bore 81. A control screw 80 having a knob 82 is threaded in the bore 81, and a nosepiece 83 of the screw 80 may be caused to engage the block 78 to thereby move the extension 74 away from the extension 73; this will tend to enlarge the diameter of the split ring 71.

Depending from the split ring 71 is a generally annular split block 84, which is secured to the split ring 71 by suitable screws, as shown. Movement of the screw 80 to engage the block 78, and move the extension 74 away from the extension 73, will therefore, cause the brake block 84 to press against the interior surface of the journal 66, and thereby positively lock the housing 22 and telescope 21 into a desired position relative to platen 64. Should it be desired to rotate the housing 22 and telescope 21 in a generally horizontal plane, it will only be necessary to unloosen the screw 80 so as to free the brake block 84 from pressing engagement of the interior of the journal 66 and to rotate housing 22 on journal 66 through the ball bearing 67.

The eyepiece of the telescope 21 is illuminated, as will be hereinafter described, and in order to provide electric current to the eyepiece in any position thereof, there is provided on the platen 64, as may be seen in FIG. 6, an annular ring 90 having a depending post 91 thereon. The ring 90 and post 91 are insulated from the platen 64 by suitable insulation, which is indicated generally at 92.

A connector arm 93 is mechanically and electrically joined to the post 91 by a screw 94, the arm 93 having at its outer end a screw 95 for receiving a lead wire 96. Carried in the bottom plate 22B is an insulating member 97, having a central hole and through this hole there extends a contact member 98. Contact member 98 is urged downwardly against the ring 90 by a spring 99. This spring is secured to the bottom plate 22B by a screw 101, which screw also serves to connect the spring 99 with a conducting wire 102. As will be understood, the wire 96 may lead from a suitable source of energy, which preferably will be a miniaturized battery. Electric current may be supplied to the wire 102 from wire 96 by the ring 90 and contact member 98, in whatever relative position housing 22 may take, with respect to the platen 64.

The wire 102 may be led along or through the tube of the telescope 21, and as is indicated in FIG. 3, may be secured to a rear plate 103 by a screw 104.

The eyepiece 110 comprises, as may be seen in FIG. 3, a forwardly extending tube 111 that is carried in the inner race of a ball bearing 112. The ball bearing 112 is supported in a ring 113 that is carried by four adjustment screws, screws 114 and 115 being shown in FIG. 3 and screws 114, 116 and 117 being shown in FIG. 1. By means of these adjusting screws, the eyepiece 110 may be moved relatively to the optical system in the telescope 21 in order to insure that the optical system of the eyepiece is in alignment with the optical system of telescope 21. It will be understood, of course, that the entire eyepiece 110 may be rotated through 360° by virtue of the above described connection of it to the telescope 21, including the ball bearing 112.

With further regard to the optical system, the shaft 33 is coincident with the optical axis of telescope 21. The line of intersection of the two reflecting surfaces of prism 45 lies on and is perpendicular to the telescope optical axis, and the reflecting surfaces of prism 45 make an angle of 135° with the telescope optical axis.

Referring now to FIG. 7, it may be seen that the eyepiece 110 has mounted on it a potentiometer 119, this potentiometer including a knob 121 for adjustment purposes and a spring-pressed contact member 122. The member 122 bears against an annular contact plate 123 which is carried by the end plate 103 of the telescope 21. Consequently, in the aforementioned rotation of the eyepiece 110 in the ring 133, the contact member 122 will always be in contact with the plate 123 and thereby supply current to the potentiometer 119. From potentiometer 119 there extends two pairs of leads 125 and 126, which are connected with small voltage miniature light bulbs 127 and 128, respectively. The miniature light bulbs 127 and 128 are carried in an illuminator generally designated 130, this illuminator being made of a suitable light conducting plastic material and comprising an annular ring 131 and oppositely disposed extensions 131 and 133. A forward planar face 134 of illuminator 130 permits light to escape in a generally forward direction, the remainder of the illuminator 130 being suitably coated with a light impervious material to prevent the escape of light.

Forwardly of the illuminator 130 there is positioned a first ring 136 carrying a pair of perpendicular crosshairs 137. The ring 136 is laterally movable in the main tube 109 of the eyepiece 110, this movement being effected by a micrometer generally designated 138. The micrometer 138 comprises a fixed drum or wheel 139 and a movable drum 140, to the latter of which there is attached an adjusting screw 141 having an extremely fine lead and carried in a supporting sleeve 142 of drum 139.

Immediately to the front of the crosshairs 137 and supporting ring 136 there is a second ring 144 supporting a single vertical crosshair 145. The ring 144 and the crosshair 145 are fixed with respect to the tube 109 of eyepiece 110.

The crosshairs 137 and the hair 145 are made of fiberglass, each being a single strand and coated with white lacquer.

The illumination of the crosshairs, as shown in FIG. 7, provides for the viewing of the reticle under adverse conditions so as to enable better perception of the target. Also, the illumination of the reticle provides for autocollimation of the instrument. Thus, with a reflecting surface held against one or the other of the windows in the plates of the housing 22, light rays may be passed from the illuminator to the reticle and the image of the reticle reflected from the surface of prism 45 to and through the window, and then reflected back from the said reflecting surface placed against the window, again reflected by the surface of prism 45 and viewed through the eyepiece. If the images coincide, it will then be known that all optical parts are in proper alignment and orientation.

In operation, the instrument 20, together with the tripod 60 will be set up over a bench mark or base point. Above this bench mark there will have been constructed a superstructure for supporting a master unit of the electronic system, to carry forward the exemplary problem hereinabove referred to. The tripod 60 and instrument 20 will be adjusted so that the housing 22 is centrally of the bench mark. With the prism 45 turned 90° from the position shown in FIGS. 1 and 3, the bench mark may be seen through the optical system of telescope 21 as reflected by a lower surface of prism 45, the image coming through the window 65B. A similar mark in the equipment above the instrument 20 will have its image transmitted through the window 24A in the upper plate 22A of the housing 22, will be reflected by an upper surface of prism 45 and may be viewed through the eyepiece with the image traveling through the optical system of the telescope 21. When the images of the two reference marks coincide in the eyepiece of the telescope, the observer will know that these two reference marks are in the same vertical line and that the prism 45 is on this line also. The prism 45 may then be rotated through 90°, exactly, with the aid of the knob 32 and the magnetic stops 49 and 50, and then the entire instrument rotated on the vertical axis provided by the journal 66, the braking mechanism 70 being at this time ineffective. When previously placed targets lying on an axis or line extending in a horizontal plane through the aforementioned vertical line are seen through the windows in the side plates 22E and 22F, the screw 80 of the brake mechanism 70 may be turned so as to engage with the block 78 and cause engagement of the brake block 84 with the interior of journal 66 to thereby lock the instrument 20 in a selected position. If the target or reference markers are out of position, then their images will not coincide in the eyepiece 110, and consequently these targets, one or both, may be moved.

Prior to actually using the instrument, it is leveled to high degree of accuracy by the utilization of the optical system. The prism 45 is positioned so that it may reflect images through the top and bottom plates 22A and 22B. The instrument is leveled to the extent possible with the bubble level, and a collimated beam of light is passed downwardly past a pool of mercury in a dish-shaped container, and is reflected by the upper surface of prism 45 through the objective lens 27 of telescope 21, past the reticle 137. A similar arrangement below the instrument will project an image onto the lower surface of prism 45, and this image will be similarly reflected. The two mercury pools being in absolute vertical alignment, their images will coincide on the intersection point of reticle 137. The eyepiece is then rotated through 360°, and when, after utilizing the level adjustment screws 63, the coincident images do not vary from the intersection point of the reticle 137, the instrument will be level to an extremely high degree of accuracy.

Figure 8:
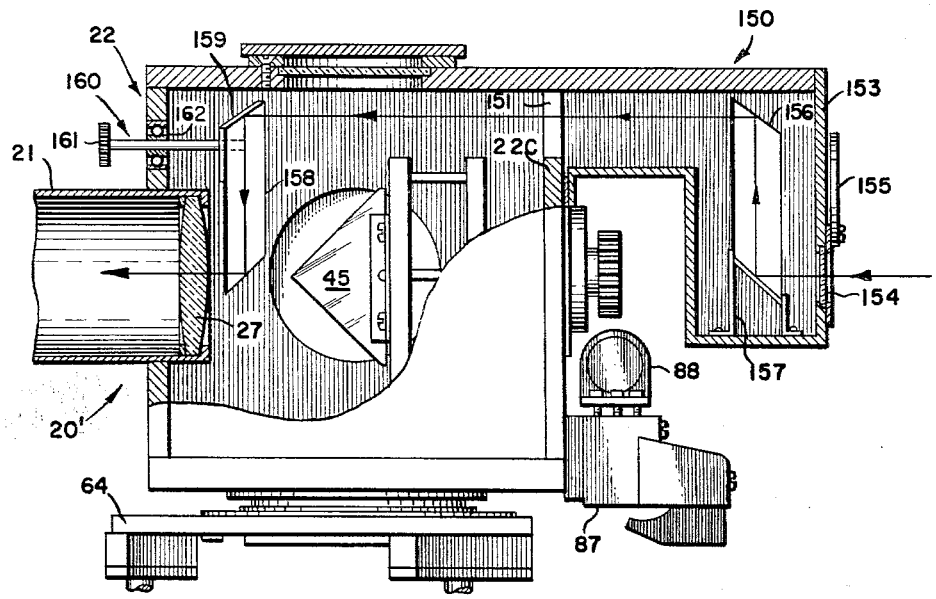
FIG. 8 is a cross-sectional view, similar to FIG. 3, of another embodiment of the invention.

Referring now to FIG. 8, there is shown an instrument 20 that is generally similar to instrument 20 hereinabove described, and further provided with an optical system for viewing an image in line with the optical axis of the telescope 21. To this end there is provided in the upper part of the front plate 22C of the housing 22 an opening 151, and mounted on the front plate 22C in front of the opening 151 is a supplemental housing 150, housing 150 having a generally L-shaped cross-sectional configuration and being provided with an opening 152 in the front walls 153 thereof. The opening 152 has a window 154 therein, which is optically flat, and it will be observed that the opening 152 is offset from the opening 151 and is in substantial alignment with the optical axis of the telescope 21. A hinged cover 155 is provided for protecting the window 154. Within one leg of the L-shaped housing 150 there is provided a rhomboid prism 156. Prism 156 is fixedly mounted in the housing as by a support 157, it being understood that the mounting of the prism 156 may take any form and the support 157 is illustrative only.

Within the housing 22 there is provided a second rhomboid prism 158. The prism 158 is held in place by a support 159 carried by a shaft 160 having a control knob 161 on the outer end thereof. Shaft 160 is mounted in ball bearing 162, and thus the shaft 160 may be rotated, in a vertical plane in the normal usage of the instrument, to either place the rhomboid prism 158 in position as shown in FIG. 8, or to move the prism 158 away from in front of the objective lens 27 of the telescope 21. As will be understood, magnetic stop means similar to those in FIG. 7 may be incorporated in the structure in FIG. 8 in order to position the prism 158 accurately in front of the telescope objective lens 27.

There may also be seen in FIG. 8 the counterweight 87 and bubble level 88.

The use of the instrument shown in FIG. 8 is generally similar to that of the instrument shown in FIGS. 1 to 7; however, with the rhomboid prism 158 in the position shown in FIG. 8, a target directly ahead of the telescope 21 may be viewed, in addition to the two laterally aligned targets and two vertically aligned targets, without moving the instrument or journal 66.

It will be obvious to those skilled in the art that various changes may be made without departing from the spirit of the invention and therefore the invention is not limited to what is shown in the drawings and described in the specification but only as indicated in the appended claims.

What is claimed is:

1. In an optical instrument, a generally horizontal telescope having an optical axis, a generally cubic housing having openings in at least five faces thereof, means securing said telescope to an opening in a first, vertical face with the optical axis thereof substantially perpendicular to said face, the faces of said housing perpendicular to said first face having openings therethrough, reflecting means in said housing comprising a pair of reflecting surfaces diverging at substantially 90° from a common line of intersection, means rotatably supporting said reflecting means for rotation on an axis coincident with the telescope optical axis and with the line of intersection perpendicular to the telescope optical axis, means for positively holding said reflecting means in either of two positions 90° apart with said line either horizontal or vertical, means mounting said housing for rotation on a substantially vertical axis and including a hollow journal, said journal extending through the opening in the bottom face of said housing, releasable brake means for securing said housing in any position relative to said journal, said telescope having an eyepiece comprising an annular plastic illuminator, said illuminator having at least one extension with a hollow therein, a bulb in said hollow, said illuminator being substantially coaxial with said eyepiece and having a light-emitting forward face, a reticle forwardly of said illuminator, and means for connecting said bulb to a source of energy in any position of said instrument.

2. In an optical instrument, a generally horizontal telescope having an optical axis, a generally cubic housing having openings in at least five faces thereof, means securing said telescope to an opening in a first, vertical face with the optical axis thereof substantially perpendicular to said face, the faces of said housing perpendicular to said first face having openings therethrough, reflecting means in said housing comprising a pair of reflecting surfaces diverging at substantially 90° from a common line of intersection, means rotatably supporting said reflecting means for rotation on an axis coincident with the telescope optical axis and with the line of intersection perpendicular to the telescope optical axis, means for positively holding said reflecting means in either of two positions 90° apart with said line either horizontal or vertical, means mounting said housing for rotation on a substantially vertical axis and including a hollow journal, said journal extending through the opening in the bottom face of said housing, and releasable brake means for securing said housing in any position relative to said journal.

3. In an optical instrument, a generally horizontal telescope having an optical axis, a housing, means securing said telescope to an opening in said housing, reflecting means in said housing comprising a pair of reflecting surfaces diverging at substantially 90° from a common line of intersection, means rotatably supporting said reflecting means for rotation on an axis coincident with the telescope optical axis and with the line of intersection perpendicular to the telescope optical axis, means for positively holding said reflecting means in either of two positions 90° apart with said line either horizontal or vertical, and openings in said housing to admit light to said reflecting surfaces in either of said positions thereof.

4. The optical instrument of claim 3, and further optical means operatively associated therewith for transmitting light rays through said telescope from an object in line with said optical axis exteriorly of said housing.

5. The optical instrument of claim 3, and further including optical means forwardly of said reflecting means for receiving light rays from an object in line with and in advance of said telescope and transmitting said light rays in a path parallel to and spaced from the telescope optical axis, second optical means for receiving light rays from said first optical means and for directing said light rays into said telescope and toward the eye piece thereof, and means mounting said last mentioned optical means for movement between positions in front of and removed from said telescope optical axis.

6. In an optical instrument, a generally horizontal telescope having an optical axis, a housing, means securing said telescope to an opening in said housing, reflecting means in said housing comprising a pair of reflecting surfaces diverging at substantially 90° from a common line of intersection, means rotatably supporting said reflecting means for rotation on an axis coincident with the telescope optical axis and with the line of intersection perpendicular to the telescope optical axis, means for positively holding said reflecting means in either of two positions 90° apart with said line either horizontal or vertical, and means mounting said housing for rotation on a substantially vertical axis and including a hollow journal, said journal extending through the opening in the bottom of said housing and being in line with said reflecting means to thereby provide for viewing an object below said housing.

7. In an optical instrument, a generally horizontal telescope having an optical axis, a housing, means securing said telescope to an opening in said housing, reflecting means in said housing comprising a pair of reflecting surfaces diverging at substantially 90° from a common line of intersection, means rotatably supporting said reflecting means for rotation on an axis coincident with the telescope optical axis and with the line of intersection perpendicular to the telescope optical axis, means for positively holding said reflecting means in either of two positions 90° apart with said line either horizontal or vertical, means mounting said housing for rotation on a substantially vertical axis including a hollow journal, said journal extending through the bottom of said housing, and releasable brake means for securing said housing in any position relative to said journal, said brake means comprising an arcuate brake block in and adjacent the inner wall of said journal.

8. In an optical instrument, a generally horizontal telescope having an optical axis, a housing, means securing said telescope to an opening in said housing, reflecting means in said housing comprising a pair of reflecting surfaces diverging at substantially 90° from a common line of intersection, means rotatably supporting said reflecting means for rotation on an axis coincident with the telescope optical axis and with the line of intersection perpendicular to the telescope optical axis, means for positively holding said reflecting means in either of two positions 90° apart with said line either horizontal or vertical, said telescope having an eyepiece comprising an annular light-conducting plastic illuminator, said illuminator having a hollow therein, a bulb in said hollow, said illuminator being substantially coaxial with said eyepiece and having a light-emitting forward face, and a reticle forwardly of said illuminator.

9. In an optical instrument, a generally horizontal telescope having an optical axis, a housing, means securing said telescope to an opening in said housing, reflecting means in said housing comprising a pair of reflecting surfaces diverging at substantially 90° from a common line of intersection, means rotatably supporting said reflecting means for rotation on an axis coincident with the telescope optical axis and with the line of intersection perpendicular to the telescope optical axis, means for positively holding said reflecting means in either of two positions 90° apart, with said line either horizontal or vertical, said last mentioned means comprising a detent member secured to said reflecting means and a pair of magnetic stop members positioned in said housing to be engaged by said detent member, said detent member being of magnetically attractable material.

10. In an optical instrument a telescope having an eyepiece, an objective lens and an optical axis, a housing, means securing said telescope to an opening in said housing with the objective lens thereof adjacent said housing, reflecting means in said housing comprising a pair of reflecting surfaces diverging at substantially 90° and each having an angle of 135° with the telescope optical axis, the line of intersection of the planes of said surfaces being perpendicularly intersected by the telescope optical axis, means rotatably supporting said reflecting means for rotation on an axis coincident with the telescope optical axis, means for positively holding said reflecting means in either of two positions 90° apart, and opening in said housing for admitting light to said reflecting surfaces in either of said positions thereof.

11. The optical instrument of claim 10, and means for transmitting light rays into said telescope objective lens towards the eyepiece from an object exteriorly of said housing and beyond said reflecting surfaces.

12. In an optical instrument a telescope having an eyepiece, an objective lens and an optical axis, a housing, means securing said telescope to an opening in said housing with the objective lens thereof adjacent said housing, optical means in said housing for directing light into said telescope from objects lying on an axis perpendicular to said telescope axis and to either side of said optical means, means rotatably supporting said optical means for rotation on an axis coincident with the telescope optical axis, interengaging means for establishing a first selected position for said optical means, means in said housing for admitting light to said optical means in said first position thereof, interengaging means for establishing a second selected position for said optical means spaced a predetermined arcuate amount from said first position, and means in said housing for admitting light to said optical means in said second position thereof, whereby the said instrument may be placed between a first pair of aligned targets which may thereby be viewed simultaneously through said telescope when said optical means is in the first position thereof and whereby a second pair of aligned targets between which said instrument is placed may be viewed simultaneously when said optical means is in the second position thereof.

13. An optical instrument as set forth in claim 12, a reflecting surface in a plane parallel to said optical axis and in a path of light to said optical means in a said position thereof.

14. An optical instrument as set forth in claim 12, and means for transmitting light rays into said telescope objective lens toward the eyepiece thereof from an object exteriorly of said housing on the telescope optical axis.

References Cited by the Examiner

UNITED STATES PATENTS

| | | |
|---|---|---|
| 578,459 | 3/1897 | Leuner. |
| 730,016 | 6/1903 | Hein _____ 33—46 |
| 1,118,193 | 11/1914 | Ferber _____ 88—1 |
| 1,799,088 | 3/1931 | Caproni. |
| 1,874,571 | 8/1932 | Mitchell. |
| 2,186,143 | 1/1940 | Neugass _____ 128—20 |
| 2,221,152 | 11/1940 | Rylsky. |
| 2,247,113 | 6/1941 | Benford _____ 88—14 |
| 2,259,910 | 10/1941 | Rylsky. |
| 2,358,867 | 9/1944 | Madan _____ 240—6.4 |
| 2,420,951 | 5/1947 | Williams et al. _____ 88—74 |
| 2,458,399 | 1/1949 | Mihalyi et al. _____ 248—183 |
| 2,485,558 | 10/1949 | Braunlich. |
| 2,588,974 | 3/1952 | Fontaine _____ 88—14 |
| 2,632,801 | 3/1953 | Donaldson. |
| 2,774,275 | 12/1956 | Keller _____ 88—14 X |
| 2,849,911 | 9/1958 | Brunson _____ 88—14 |
| 2,953,970 | 9/1960 | Maynard. |
| 2,997,918 | 8/1961 | Spear _____ 88—56 |
| 2,998,953 | 9/1961 | O'Conner _____ 248—183 |

FOREIGN PATENTS

| | | |
|---|---|---|
| 586,303 | 11/1959 | Canada. |
| 238,275 | 8/1925 | Great Britain. |

JEWELL H. PEDERSEN, *Primary Examiner.*

WILLIAM MISIEK, *Examiner.*

T. L. HUDSON, *Assistant Examiner.*